US012117139B2

(12) United States Patent
Debaine et al.

(10) Patent No.: US 12,117,139 B2
(45) Date of Patent: Oct. 15, 2024

(54) LIGHT-EMITTING MODULE THAT IMAGES THE ILLUMINATED SURFACE OF A COLLECTOR, WITH A BLOCKER OF PARASITIC RAYS

(71) Applicant: VALEO VISION, Bobigny (FR)

(72) Inventors: Corentin Debaine, Bobigny (FR); Sylvain Giraud, Bobigny (FR); Yves Gromfeld, Bobigny (FR); Clement Olchewsky, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/256,281

(22) PCT Filed: Dec. 16, 2021

(86) PCT No.: PCT/EP2021/086320
§ 371 (c)(1),
(2) Date: Jun. 7, 2023

(87) PCT Pub. No.: WO2022/129420
PCT Pub. Date: Jun. 23, 2022

(65) Prior Publication Data

US 2024/0027047 A1 Jan. 25, 2024

(30) Foreign Application Priority Data

Dec. 17, 2020 (FR) ....................................... 2013547

(51) Int. Cl.
*F21S 41/43* (2018.01)
*F21S 41/148* (2018.01)
*F21S 41/255* (2018.01)
*F21S 41/32* (2018.01)
*F21S 45/47* (2018.01)

(52) U.S. Cl.
CPC ........... *F21S 41/323* (2018.01); *F21S 41/148* (2018.01); *F21S 41/255* (2018.01); *F21S 41/43* (2018.01); *F21S 45/47* (2018.01)

(58) Field of Classification Search
CPC . B60Q 1/04; F21W 2107/10; F21W 2102/13; F21W 2102/00; F21W 2102/135;
(Continued)

(56) References Cited

U.S. PATENT DOCUMENTS 9,243,770 B2 1/2016 Schwaiger et al.
10,578,267 B2 3/2020 Bowles et al.
(Continued)

FOREIGN PATENT DOCUMENTS

CN 208074872 U * 11/2018 .............. B60Q 1/04
DE 102012206397 A1 10/2013
(Continued)

OTHER PUBLICATIONS

Search English translation of WO 2020085044 A1 (Year: 2020).*
(Continued)

*Primary Examiner* — Omar Rojas Cadima
(74) *Attorney, Agent, or Firm* — Valeo Vision

(57) ABSTRACT

The invention relates to a light-emitting module including a light source capable of emitting light rays, a collector with a reflective surface, an optical system configured to project a light beam by imaging a portion of the reflective surface located behind the light source, a screen located in front of the light source, with a rear face arranged so as to gather light rays which are emitted forward by the light source and are not reflected by the reflective surface. The screen includes an end face, adjacent to the rear face and facing the reflected light rays, which is configured to avoid and/or to absorb the reflected light rays.

16 Claims, 7 Drawing Sheets

(58) Field of Classification Search
CPC ........... F21W 2102/18; F21W 2102/30; F21W 2103/20; F21S 45/00; F21S 41/00; F21S 43/40; F21S 41/265; F21S 41/255; F21S 43/14; F21S 41/141; F21S 41/148; G02B 6/003; G02B 6/002; F21Y 2115/10
See application file for complete search history.

(56) References Cited

U.S. PATENT DOCUMENTS

| | | | | |
|---|---|---|---|---|
| 11,022,266 | B2 | 6/2021 | Hermitte et al. | |
| 11,280,464 | B2 | 3/2022 | Giraud | |
| 2011/0249461 | A1* | 10/2011 | Sugie | F21S 41/192 362/516 |

FOREIGN PATENT DOCUMENTS

| | | | | |
|---|---|---|---|---|
| EP | 3147556 | A1 | 3/2017 | |
| EP | 3708904 | A1 | 9/2020 | |
| FR | 3084728 | A1 | 2/2020 | |
| JP | 2011181421 | A | 9/2011 | |
| JP | 2014107015 | A | 6/2014 | |
| JP | 2014235874 | A | 12/2014 | |
| JP | 2016213023 | A | 12/2016 | |
| JP | 2018116802 | A | 7/2018 | |
| WO | 2019124238 | A1 | 6/2019 | |
| WO | 020025171 | A1 | 2/2020 | |
| WO | WO-2020085044 | A1 * | 4/2020 | F21S 41/148 |

OTHER PUBLICATIONS

Search English translation of CN 208074872 U (Year: 2018).*
European Patent Office, International Search Report (with English translation) and Written Opinion of corresponding International Application No. PCT/EP2021/086320, dated Feb. 28, 2022.
Japan Patent Office, Office Action (with English translation) of corresponding Japanese Patent Application No. 2023-537035, dated Aug. 2, 2024.

* cited by examiner

LIGHT-EMITTING MODULE THAT IMAGES THE ILLUMINATED SURFACE OF A COLLECTOR, WITH A BLOCKER OF PARASITIC RAYS

TECHNICAL FIELD

The invention relates to the technical field of lighting and signalling, more particularly for applications in the automotive field.

BACKGROUND OF THE INVENTION

It is generally known practice to produce a cutoff lighting beam by using one or more light-emitting modules with a folder. Such a light-emitting module conventionally comprises a collector with a reflective surface of revolution having an elliptical profile, in the form of a cap in a half-space delimited by a horizontal plane. An essentially point light source, of the light-emitting diode type, is located at a first focus of the reflective surface and shines into the half-space in the direction of said surface. The rays are thus reflected in a convergent manner toward a second focus of the reflective surface. Another, generally planar, reflective surface with a cutoff edge at the second focus ensures an upward reflection of the rays which do not pass precisely through the second focus, these rays then being refracted by a thick lens toward the bottom of the lighting beam. This reflective surface is commonly referred to as a "folder" in that it "folds" toward the top of the projecting lens those rays which would otherwise form an upper portion of the lighting beam. Such a light-emitting module has the drawback of requiring the folder and the cutoff edge to be positioned with a high degree of precision. Also, the projecting lens must be a thick lens because of its small focal length, increasing its weight and complicating its production, in particular as regards sink marks. In addition, the collector has a certain height and, thus, a certain height wise bulk.

The published patent document WO 2020/025171 A1 discloses a light-emitting module, in particular for a motor vehicle, comprising a collector with a reflective surface collecting and reflecting the light rays emitted by a light source in a light beam, similar to a light-emitting module with a folder. The light-emitting module also includes a projecting optical system, such as a lens, specifically configured to project the light beam in question by forming an image of the reflective surface of the collector. To this end, the projecting optical system has a focus located on the reflective surface, for example at a rear edge of the latter so as to correctly image said edge and form a clean cut in the projected light beam. Certain rays emitted by the light source and not reflected by the reflective surface of the collector can, however, reach the projecting optical system and degrade the projected light beam. To this end, a screen disposed in front of the light source is provided. However, said screen has certain difficulties in particular as regards its incidence on the rays which are reflected by the reflective surface and meet said screen and are likely to degrade the photometry of the desired beam and in particular to create parasitic rays in the beam.

SUMMARY OF THE INVENTION

The object of the invention is to overcome at least one of the drawbacks of the aforementioned prior art.

The subject of the invention is a light-emitting module comprising a light source capable of emitting light rays; a collector with a reflective surface configured to collect and reflect a portion of the light rays, referred to as reflected light rays, in a reflected light beam along an optical axis of the light-emitting module; an optical system configured to project at least the majority of the reflected light beam in a projected light beam by imaging a portion of the reflective surface located, in a general direction of propagation of the reflected light beam along the optical axis, behind the light source; a screen located in front of the light source, in the general direction of propagation of the light beam along the optical axis, with a rear face arranged so as to gather direct light rays which are emitted forward by the light source and are not reflected by the reflective surface; noteworthy in that the screen comprises an end face at a free end of said screen, facing the reflected light rays, which is arranged so as to be away from said reflected light rays and/or to absorb a portion of said reflected light rays.

Thus, the invention makes it possible to optimize the screen function of blocking the rays which are emitted directly by the light source, that is to say are not reflected by the reflective surface of the collector, and likely to reach the projecting optical system and to degrade the projected light beam, in particular at the cutoff in the case of a cutoff light beam. Indeed, this blocking of the direct rays, in particular by way of absorption or appropriate deflection, is carried out while preventing the projected light beam from being interfered with in a detrimental manner.

Advantageously, the end face is adjacent to the rear face.

Advantageously, the projected light beam may have a cutoff line, which is preferably horizontal. The invention is particularly advantageous for such a beam, with dazzling parasitic rays being reduced, or even eliminated.

The collector may have a rear edge whose profile projected by the optical system forms said cutoff line. This eliminates the need for a mask, in particular a folder for producing the cutoff line.

Advantageously, the optical system can have a focal region located on the reflective surface of the collector, in particular behind the light source. This simply makes it possible to image the portion of the reflecting surface located behind the light source.

More advantageously, the focal region may be located at a rear edge of said reflective surface.

In general, this focal region may be a focal point, also called a focus, or may be a focal line, also called a focus line.

The optical system can comprise a lens, or one or more mirrors, whose focal region is that of the optical system.

Advantageous but non-limiting embodiments of the invention are described below, one or more of these embodiments being able to be combined with one another.

The collector may be a concave reflector.

At least some of these reflected rays have angles of inclination with respect to said optical axis which are less than or equal to 10°. This allows the so-called Gaussian conditions to be reached, thus allowing stigmatism.

According to one advantageous embodiment of the invention, the end face of the screen may have a length, in the general direction of propagation of the light beam along the optical axis, of less than or equal to 1 mm, making it possible to avoid the reflected light rays.

According to one advantageous embodiment of the invention, the end face of the screen may have an inclination with respect to the nearest reflected light rays, so as to be away from said reflected light rays. This is a simple way of producing the screen while minimizing its interference with the reflected rays.

Advantageously, the reflected rays may have an inclination with respect to the optical axis, and the inclination of the end face of the screen with respect to the optical axis may be greater than the inclination of the reflected light rays nearest to said end face, or even directly adjacent to this end face, so as to be away from said reflected light rays.

The end face may be an inclined face oriented toward the optical system. In particular, it may join said rear face at an acute angle so as to form an arris. This allows the risk of interference with the reflected beam to be reduced further.

In particular, this arris may be arranged so that, at this arris, the lowest rays of the reflected beam pass skimming this arris, the other reflected rays passing above. The blocking role is thus optimized by interfering with the reflected light beam as little as possible, or even not at all. The projected beam is optimized.

According to one advantageous embodiment of the invention, the optical system has a focal region located on the reflective surface of the collector, behind the light source.

According to one advantageous embodiment of the invention, the end face of the screen may have a reflectance in the visible light spectrum of less than 0.3. This characteristic can apply to the end face in particular when said end face is not inclined.

According to one advantageous embodiment of the invention, the screen faces the reflective surface.

According to one advantageous embodiment of the invention, the screen extends transversely to the optical axis from a plate supporting the light source. By way of example, the screen may be a separate part from the plate. Alternatively, the screen may be an integral part of the plate.

According to one advantageous embodiment of the invention, the screen is an outgrowth of a radiator for cooling the light source, said radiator being located on a face of the plate that is opposite the light source.

According to one advantageous embodiment of the invention, the screen is a first screen located on the same side of the optical axis as the light source, said light-emitting module comprising a second screen located on the opposite side of the optical axis and in front of the reflective surface, and comprising a rear face configured to gather direct light rays which are emitted forward by the light source, are not reflected by the reflective surface and pass beside the end face of the first screen and between said end face and the reflective surface.

According to one advantageous embodiment of the invention, the second screen comprises an end face at a free end of said second screen and facing the reflected light rays, which is arranged so as to be away from the reflected light rays, and to absorb and/or reflect said reflected light rays toward a lower half of the reflected light beam. Advantageously, the end face of the second screen is adjacent to the rear face of said second screen.

According to one advantageous embodiment of the invention, the end face of the second screen has an inclination with respect to the nearest reflected light rays, so as to be away from said reflected light rays.

Advantageously, the reflected rays have an inclination with respect to the optical axis, and the inclination of the end face of the second screen with respect to the optical axis is greater than the inclination of the reflected light rays directly adjacent to said end face, so as to be away from said reflected light rays.

According to one advantageous embodiment of the invention, the end face of the second screen has a reflectance in the visible light spectrum of less than 0.3. This characteristic can apply to the end face of the second screen in particular when said end face is not inclined.

According to one embodiment of the invention, the end face of the second screen has a reflectance in the visible light spectrum substantially equal to 0.9. What is meant here by "substantially equal" is equality to within +/−10%.

According to one advantageous embodiment of the invention, the end face of the second screen has a convex curvature capable of reflecting the reflected light rays toward the lower half of the light beam.

According to one advantageous embodiment of the invention, the second screen is located in front of the reflective surface of the collector.

According to one advantageous embodiment of the invention, the second screen is supported by the collector. For example, the second screen may be integrally formed with the collector.

The invention also relates to a motor vehicle headlamp, comprising a light-emitting module according to the invention.

The measures of the invention are advantageous in that they allow the projected light beam to be prevented from being disturbed by parasitic light rays, doing so in an effective and simple manner. In particular, providing a screen having a specially sized and/or configured end face in order to prevent rays reflected by the reflective surface from being parasitically returned into the projected light beam.

Also, providing a second screen on the opposite side from the first screen with respect to the optical axis of the light-emitting module allows the portion of the rays which are emitted forward by the light source and are not reflected by the reflective surface to be controlled.

DETAILED DESCRIPTION OF THE INVENTION

FIGS. 1 to 4 illustrate a first embodiment of a light-emitting module according to the invention.

Figure 1:
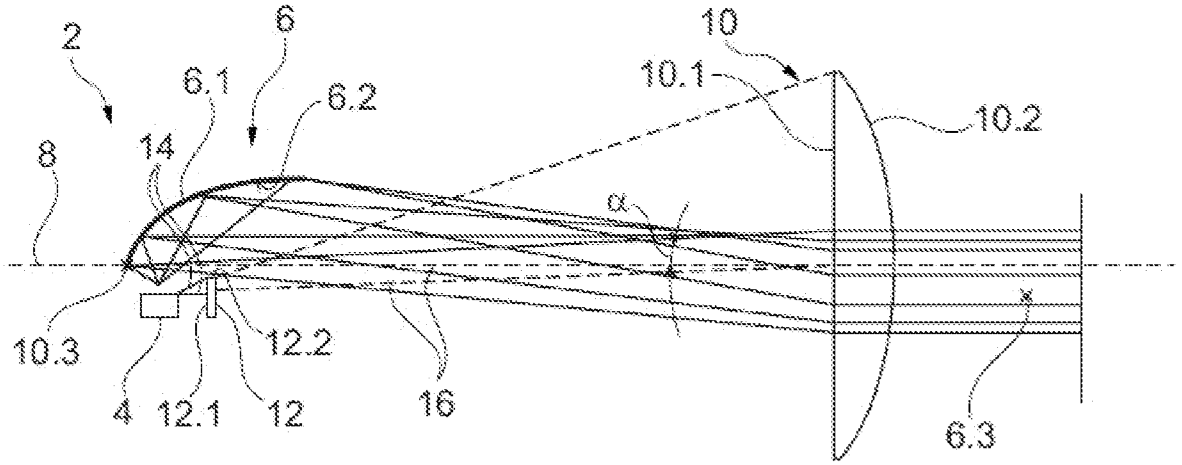
FIG. 1 is a schematic representation, in side view, of a light-emitting module according to a first embodiment of the invention.

FIG. 1 is a schematic representation, in side view, of the light-emitting module and its principle of operation. The light-emitting module 2 essentially comprises a light source 4, a collector 6 capable of reflecting the light rays emitted by the light source 4 in order to form a light beam along an optical axis 8 of the light-emitting module, and a lens 10 for projecting said beam. The optical axis 8 of the light-emitting module coincides with the optical axis of the projecting lens 10. Projecting optical systems other than the projecting lens are envisionable, such as in particular one or more mirrors.

Here, as generally according to the invention, the light source 4 is advantageously of the semiconductor type, such as in particular a light-emitting diode. In particular, the light source 4 emits light rays in a half-space delimited by the main plane of said source, in a main direction perpendicular to said plane and to the optical axis 8.

The collector 6 comprises a main body 6.1 in the form of a shell or cap, and a reflective surface 6.2 on the inner face of the main body 6.1. The reflective surface 6.2 can advantageously have a profile of the elliptical or parabolic type. It is advantageously a surface of revolution about an axis parallel to the optical axis. Alternatively, it may be a free-form surface. It may also comprise a plurality of sectors. The collector 6 in the form of a shell or cap is advantageously made of materials having good heat resistance, for example glass or synthetic polymers such as polycarbonate (PC) or polyether imide (PEI).

The expression "parabolic type" generally applies to reflectors whose surface has a single focus, that is to say one region of convergence of the light rays such that the light rays emitted by a light source placed in this region of convergence are projected to a great distance after reflection from the surface. Projected to a great distance means that these light rays do not converge toward a region located at least 10 times the dimensions of the reflector. In other words, the reflected rays do not converge toward a region of convergence or, if they do converge, this region of convergence is located at a distance greater than or equal to 10 times the dimensions of the reflector. A surface of parabolic type may or may not have parabolic portions, therefore. A reflector having such a surface is in particular used alone to create a light beam.

The light source 4 is disposed at a focus of the reflective surface 6.2 so that its rays are collected and reflected in a reflected light beam along the optical axis. At least some of these reflected rays have angles of inclination $\alpha$ with respect to said optical axis which are less than or equal to 10°, so as to be under the so-called Gaussian conditions, allowing stigmatism, that is to say sharpness of the projected image, to be obtained. The rays are advantageously reflected by the rear portion of the reflective surface 6.2.

The projecting lens 10 is advantageously a plano-convex lens, that is to say with a planar entrance face 10.1 and a convex exit face 10.2. The lens 10 is referred to as thin, for example less than 6 mm, due to the low inclination of the rays to be deflected. The lens 10 has a focus 10.3 which is located along the optical axis 8, at the light source 4 or behind said source. In this case, the focus 10.3 is located on the reflective surface 6.2 of the collector 6, more precisely at its rear edge, here also the lower edge.

The reflective surface, if it is of the elliptical type, has a second focus 6.3 located in front of the lens 10 and remotely from the optical axis 8. It should be noted that it is also possible for this focus to be located behind the lens and/or on the optical axis, preferably close to the lens, so as to reduce the width of the beam on the entrance face of the lens.

The light-emitting module 2 comprises a screen 12 disposed in front of the light source 4 and facing the reflective surface 6.2 of the collector 6, with a rear face 12.1 capable of collecting the direct light rays 14 emitted forward directly by the source in question 4, that is to say not meeting the reflective surface 6.2. Such a measure is useful for avoiding the presence of parasitic light rays likely to participate in the formation of the light beam without, however, being strictly speaking imaged. These direct rays 14, in particular those which are parallel or quasi-parallel to the optical axis 8, will then potentially illuminate an upper portion of the light beam, which is not desirable in the case of a cutoff lighting beam.

The rear face 12.1 of the screen 12 is advantageously opaque in order to absorb the direct rays 14 emitted forward directly by the light source 4, it being understood that it is also envisionable for said face to be reflective in order to reflect these rays toward an absorption region.

The screen 12 extends in a transverse main direction, which is advantageously perpendicular to the optical axis 8. It has an end face 12.2 facing the rays 16 reflected by the reflective surface 6.2. The end face 12.2 is adjacent to the rear face 12.1. It can be seen in FIG. 1 that among the rays 16 reflected by the reflective surface 6.2, the nearest rays directly adjacent to the end face 12.2 are only very slightly disturbed by said surface due to its small width along the direction of the optical axis 8. The reflected rays 16 incident on this end face 12.2 are absorbed, reflected or a combination of the two, depending on the optical reflectance properties of said face. The luminous flux associated with these rays is reduced so that the portion of these reflected rays is negligible. For this purpose, the width of the end face 12.2 is advantageously less than or equal to 1 mm.

In practice, such a thin screen 12, in the form of a blade, can be made from a sheet metal portion, the thickness of which forms the width of the screen 12.

Figure 2:
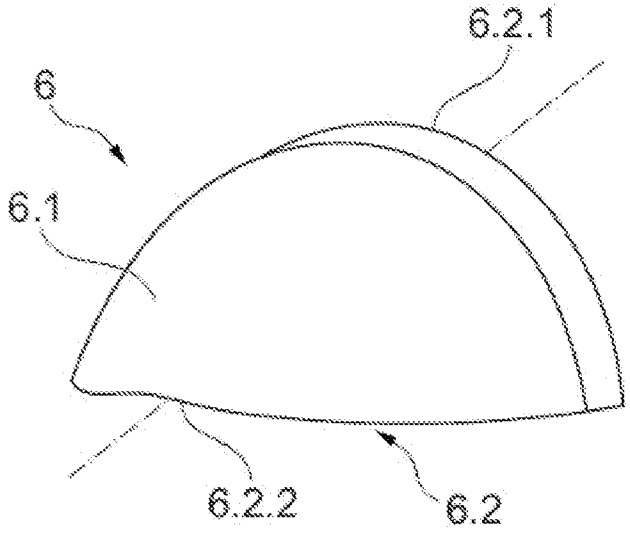
FIG. 2 is a perspective view of the collector of the light-emitting module in FIG. 1.

FIG. 2 is a rear perspective view of the collector 6 of the light-emitting module 2 in FIG. 1. The shell or cap shape of the main body 6.1 and the fact that the reflective surface (not visible) has a front edge 6.2.1 and a rear edge 6.2.2 can be seen. Bearing in mind that the main body 6.1 and consequently the reflective surface 6.2 form a shell, in particular globally symmetrical in revolution. This shell is delimited by a plane; the plane in question includes a portion of the rear edge 6.2.2. The latter extends laterally on either side of the axis of revolution. When the reflective surface 6.2 is lit by the light source, the entirety of the surface thereof is then illuminated, said surface being delimited by the front edge 6.2.1 and rear edge 6.2.2.

Figure 3:
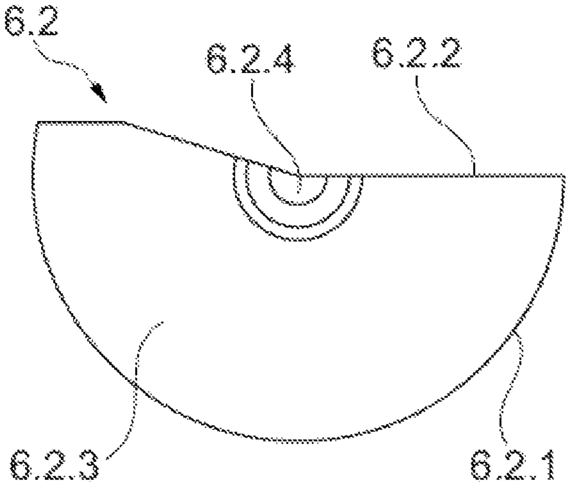
FIG. 3 is a view of the inner surface of the collector of the light-emitting module in FIG. 1, from the outside along the optical axis.

FIG. 3 is a representation of the light intensity on the reflective surface 6.2 seen from the outside, along the optical axis. More specifically, the illuminance of the surface, namely the power per unit area of the electromagnetic radiation incident perpendicular to the direction of said surface, expressed in W/m2. The region 6.2.3 covering the majority of the surface corresponds to lower illuminances, while the central region 6.2.4 corresponds to greater illuminances. It can be seen that the region 6.2.3 is clearly delimited by the edges 6.2.1 and 6.2.2. In other words, the lit surface 6.2 naturally has clear edges capable of forming cutoffs in the projected lighting beam that images this surface.

Figure 4:
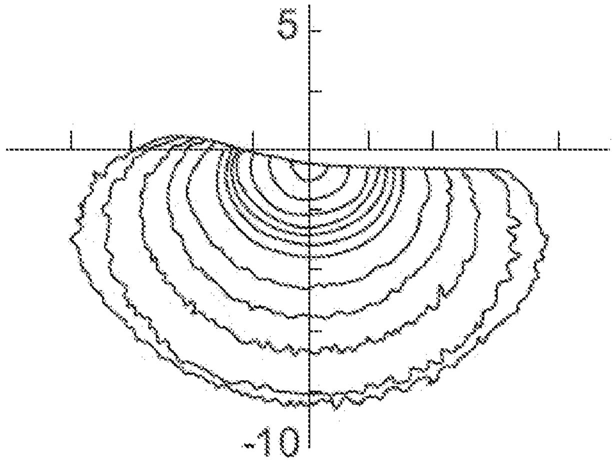
FIG. 4 is a graphical representation of the light image of the lighting beam produced by the light-emitting module in FIG. 1.

FIG. 4 is a graphical representation of the image projected by the light-emitting module in FIG. 1, in particular on a vertical screen located 25 meters from the light-emitting module. The horizontal axis and the vertical axis cross on the optical axis of the light-emitting module. The curves are isolux curves, that is to say correspond to the regions of the light beam which have the same illuminance expressed in lux. The curves at the center correspond to a higher illuminance level than at the periphery. It can be seen that the light beam produced has a horizontal cutoff, essentially on the horizontal axis, slightly below, in particular by 1 degree. The cutoff is substantially straight. In any case, the horizontal cutoff is produced by the edge 6.2.2 (FIG. 3), which is the rear edge (FIG. 2) of the reflective surface 6.2 of the collector 6.

Figure 5:
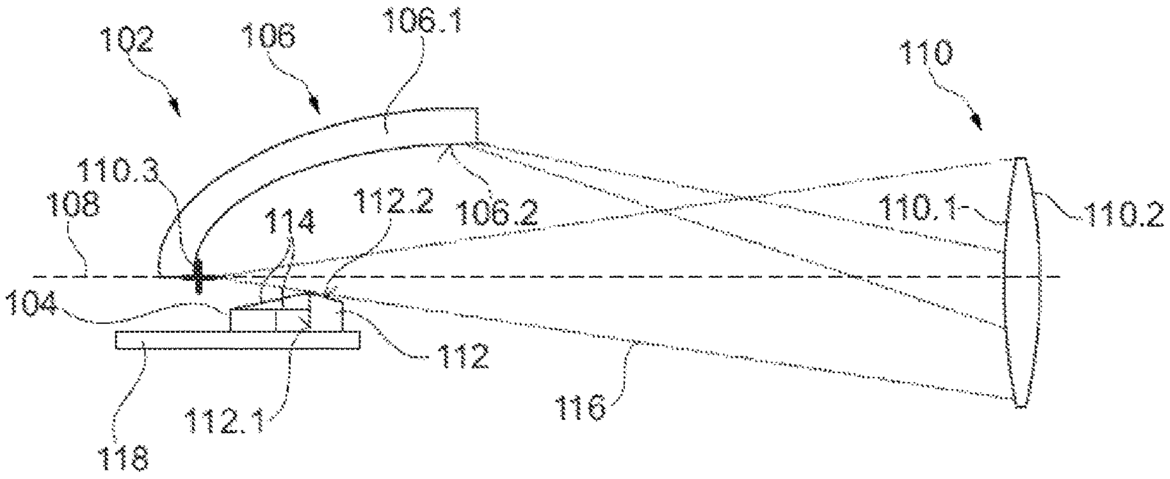
FIG. 5 is a schematic representation, in side view, of a light-emitting module according to a second embodiment of the invention.

FIG. 5 is a schematic representation, in side view, of a light-emitting module according to a second embodiment of the invention. The reference numerals of the first embodiment of the light-emitting module (FIGS. 1 to 4) are used to designate the same elements or corresponding elements, these numerals being increased by 100, however. Reference is additionally made to the description of these elements in relation to FIGS. 1 to 4.

The second embodiment is similar to the first embodiment and differs therefrom essentially in that the screen 112 is solid, that is to say does not form a thin blade like the screen 12 in FIG. 1. Given the solidness of the screen 112, the end face 112.2 has a length along the direction of the optical axis 108 that is sufficient to disturb, by reflection of reflected rays 116 from said end face 112.2, the reflected light beam, and thus the projected light beam. For this reason, the end face 112.2 is inclined toward the optical system relative to the optical axis 108 more than the directly adjacent reflected rays 116, so as to avoid the rays in question. In this way, only the rear face 112.1 of the screen 112 gathers the direct rays 114 emitted forward directly by the light source 104.

As can be seen, the light source 104 is disposed on a plate 118 which can also support the screen 112. This measure can be applied to the other embodiments, in particular the first embodiment.

As can also be seen in FIG. 5, the projecting lens 110 is of the biconvex type, that is to say that each of the input 110.1 and output 110.2 faces is convex. It is understood that the plano-convex lens of the first embodiment can be applied to this second embodiment and vice versa.

Figure 6:
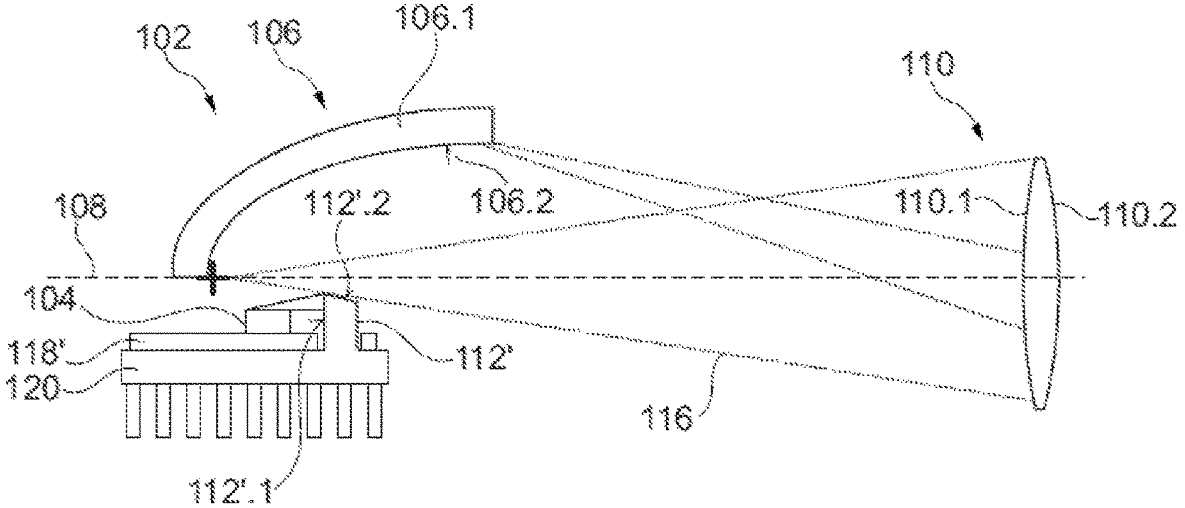
FIG. 6 is a schematic representation, in side view, of a variant of the light-emitting module of the second embodiment of the invention in FIG. 5.

FIG. 6 shows a variant of the second embodiment in FIG. 5. According to this variant, the screen 112' is integrally formed with a radiator 120 for cooling the light source 104. The latter is disposed under the plate 118', that is to say on one of the two main faces of said plate 118', which is opposite the other of said two faces, supporting the light source 104. In this case, the plate 118' has an orifice through which the screen 112' extends, it being understood, however, that it is also possible for the screen 112' to extend in front of the plate 118'.

Generally according to the invention, as here, the plate 118' can be a printed circuit board carrying the light source. Provision can also be made for the light source to be mounted directly on the radiator and connected to the printed circuit board by tracks, in particular wire bonding.

Figure 7:
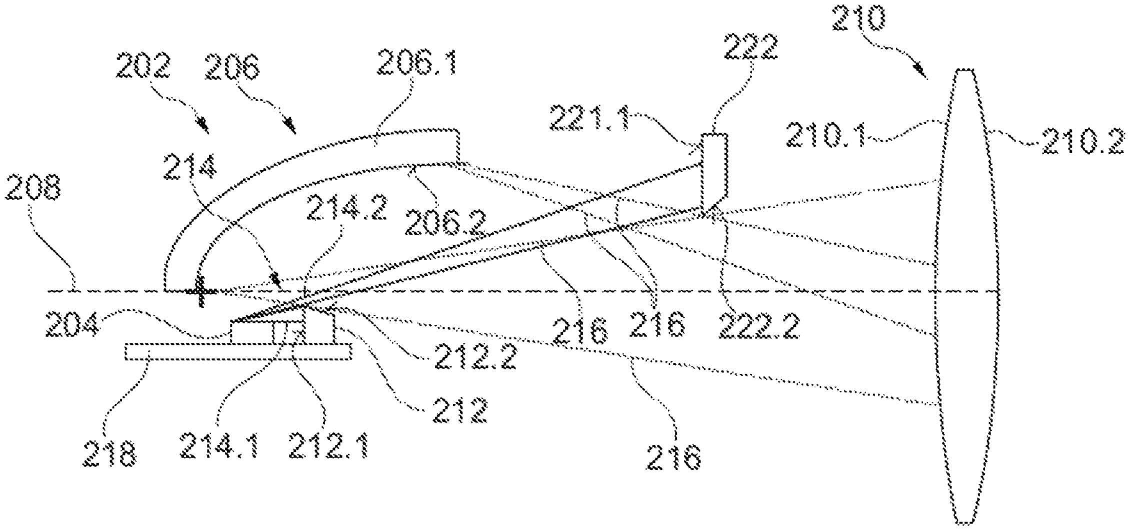
FIG. 7 is a schematic representation, in side view, of a light-emitting module according to a third embodiment of the invention.

FIG. 7 is a schematic representation, in side view, of a light-emitting module according to a third embodiment of the invention. The reference numerals of the second embodiment of the light-emitting module (FIG. 5) are used to designate the same elements or corresponding elements, these numerals being increased by 100, however. Reference is additionally made to the description of these elements within the context of the second embodiment.

The light-emitting module 202 according to this third embodiment comprises a second screen 222, which is separate from the first screen 212 and located on a side of the optical axis 208 which is opposite that where the first screen 212 is situated. The second screen 222 is configured to block the light rays 214.2 which are emitted forward by the light source, are not reflected by the reflective surface and pass beyond the first screen 212. For this purpose, the second screen 222 comprises a rear face 222.1 gathering these rays 214.2. Similarly to the first screen 212, the second screen 222 extends in a transverse main direction, which is advantageously perpendicular to the optical axis 208. It comprises an end face 222.2 facing the rays 216 reflected by the reflective surface 206.2 of the collector 206. This end face 222.2 is directly adjacent to the rear face 222.1. It is inclined with respect to the optical axis 208 more than the nearest reflected rays 216, that is to say those directly adjacent to the face in question, so as to avoid these rays in question. In other words, these rays pass by the arris formed by the intersection of the rear face 222.1 with the end face 222.2, without meeting said end face 222.2. These rays are thus not deflected. Only the direct rays 214.2 emitted forward directly by the light source and meeting the rear face 222.1 of the second screen are blocked by absorption, reflection or a combination of the two.

Figure 8:
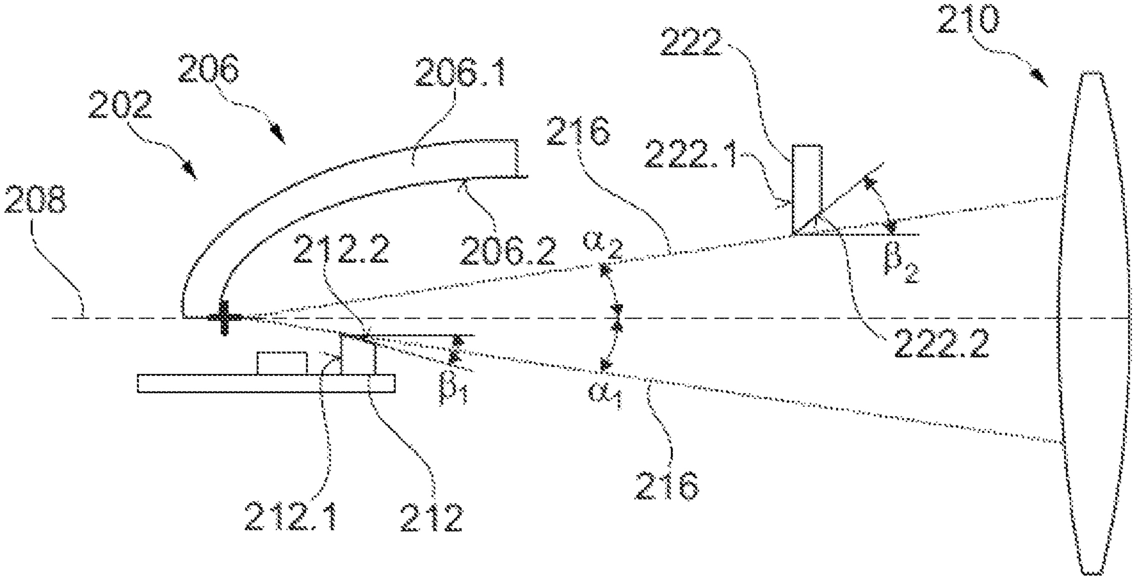
FIG. 8 corresponds to FIG. 7 of the third embodiment of the invention, illustrating the inclination of the end faces of the screens.

FIG. 8 essentially corresponds to FIG. 7, namely a schematic representation, in side view, of a light-emitting module according to the third embodiment of the invention, illustrating the inclinations of the end faces of the first and second screens 212 and 222.

It can be seen that the rays 216 reflected by the reflective surface 206.2 of the collector 306 have angles of inclination $\alpha1$ and $\alpha2$ with respect to the optical axis 208, the angle $\alpha1$ relating to the rays passing below the optical axis 208 and the angle $\alpha2$ relating to the rays passing above the optical axis 208. The end face 212.2 of the first screen 212, which is located below the optical axis 208, is inclined by an angle $\beta1>\alpha1$. Similarly, the end face 222.2 of the second screen 222, which is located above the optical axis 208, is inclined at an angle $\beta2>\alpha2$. For the two end faces 212.2 and 222.2, the inclinations are considered with respect to an arris that corresponds to the intersection of the rear face 212.1 or 222.1 with the end face 212.2 or 222.2. In other words, the inclinations $\beta1$ and $\beta2$ of each of the end faces 212.1 and 222.1 are such that each of said faces gradually moves away from the reflected rays 216 passing directly by the arris formed by the intersection of the rear face 212.1 or 222.1 with the end face 212.2 or 222.2, moving away from said arris in the direction of propagation of the reflected rays 216.

Figure 9:
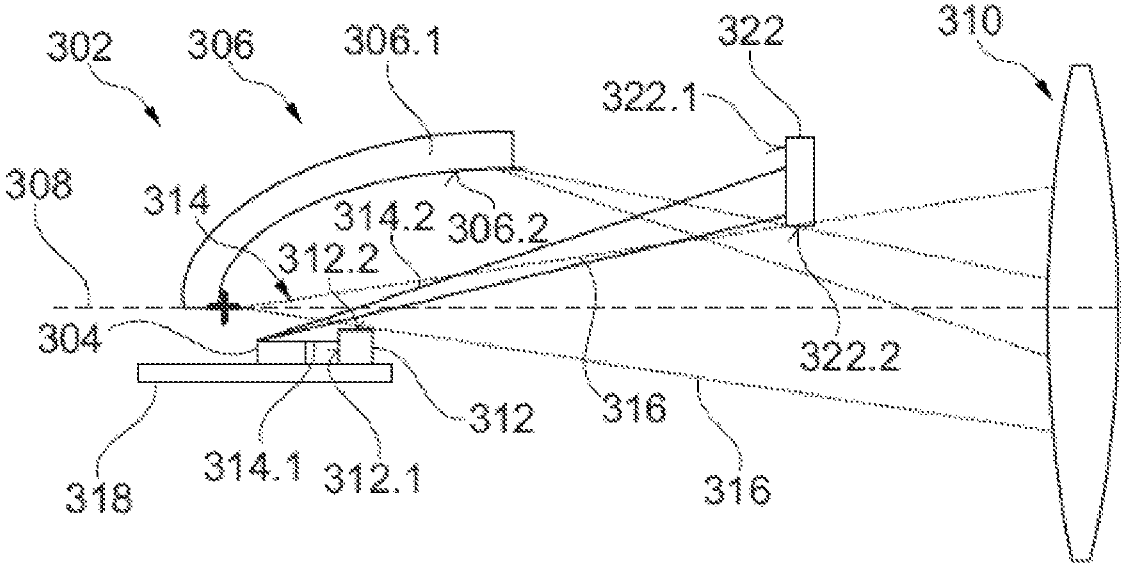
FIG. 9 is a schematic representation, in side view, of a light-emitting module according to a fourth embodiment of the invention.

FIG. 9 is a schematic representation, in side view, of a light-emitting module according to a fourth embodiment of the invention. The reference numerals of the third embodiment of the light-emitting module (FIG. 7) are used to designate the same elements or corresponding elements, these numerals being increased by 100, however. Reference is additionally made to the description of these elements within the context of the third embodiment.

The light-emitting module 302 according to the fourth embodiment differs from the third embodiment essentially in that the end faces 312.2 and 322.2 of the first and second screens 312 and 322, respectively, are not inclined more than the reflected rays 316 passing close to said faces but have light absorption properties, expressed by a reflectance rate for visible light of less than or equal to 30%, preferably 20%, even more preferably 10%. This means that the reflected rays 316 from ends of the light beam directed toward the lens 310 that meet the end faces 312.2 and 322.2 are absorbed, at least for the most part. If there are reflections, they are minor and negligible.

Figure 10:
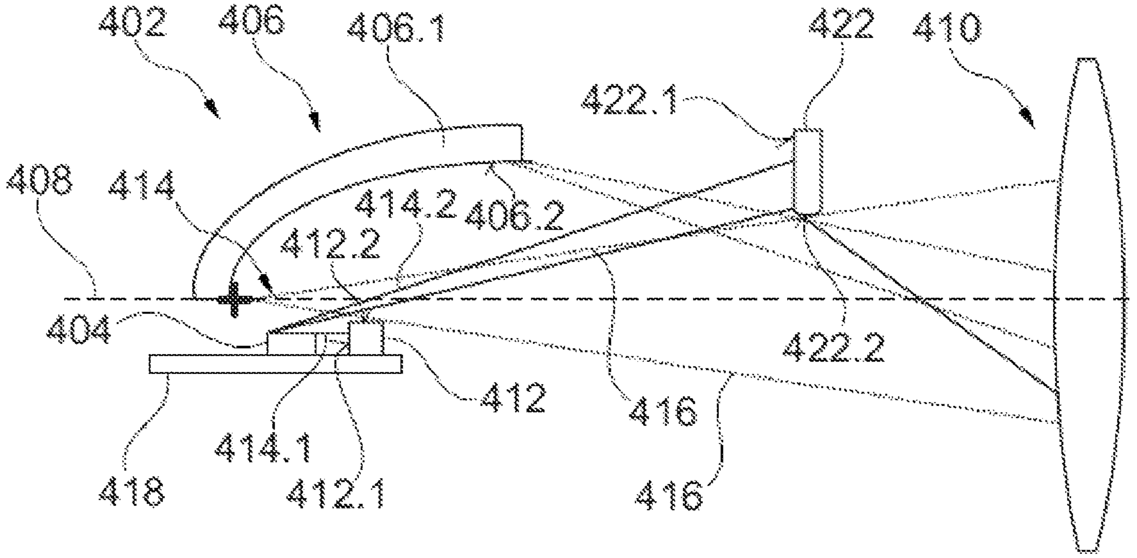
FIG. 10 is a schematic representation, in side view, of a light-emitting module according to a fifth embodiment of the invention.

FIG. 10 is a schematic representation, in side view, of a light-emitting module according to a fifth embodiment of the invention. The reference numerals of the fourth embodiment of the light-emitting module (FIG. 9) are used to designate the same elements or corresponding elements, these numerals being increased by 100, however. Reference is additionally made to the description of these elements within the context of the fourth embodiment.

The light-emitting module 402 according to the fifth embodiment differs from the fourth embodiment essentially in that the end face 422.2 of the second screen 422 is rounded and reflective.

As can be seen in FIG. 10, the direct rays 414.2 meeting the end face 422.2 are reflected toward a lower part, in this case the lower half, of the projecting lens 410. The inclination of the reflected rays is such that these rays will be projected toward a low portion of the light beam. Referring to FIG. 4, which illustrates the light image of the lighting beam produced by a light-emitting module such as that in FIG. 1 but also in FIGS. 5 to 10, the rays reflected by the end face 422.2 of the second screen will, once projected by the projecting lens 410, take part in the formation of the light image remotely from the horizontal cutoff edge. These rays will therefore not significantly disturb the light image produced. This measure additionally makes it possible to optimize light output by recovering light that would otherwise be lost. The reflective properties of the end face can also be obtained easily when the screen is made of a naturally reflective material such as aluminum.

Figure 11:
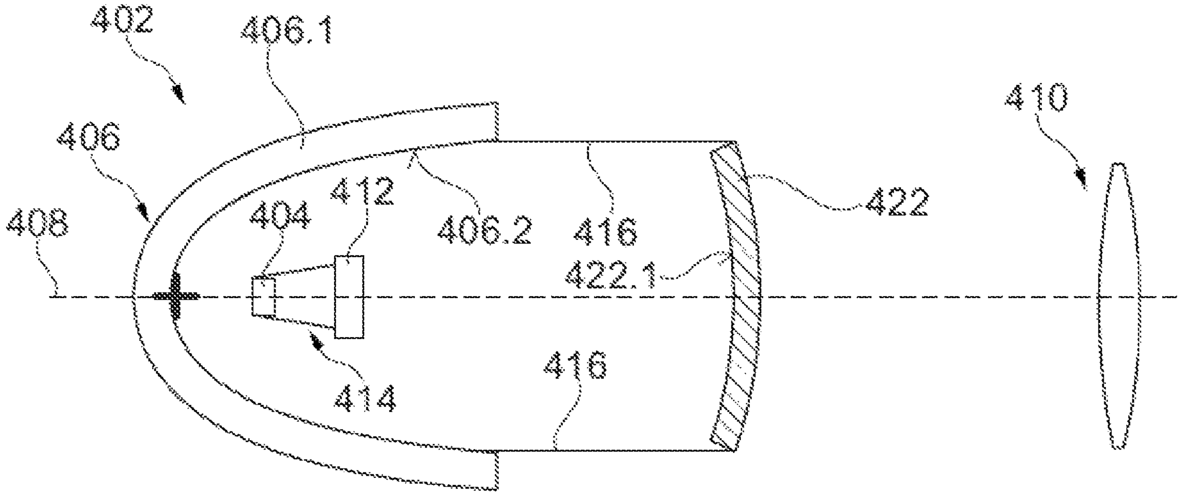
FIG. 11 is a schematic representation, in top view, of a light-emitting module according to the fifth embodiment of the invention while applying to each of the different embodiments of the invention.

FIG. 11 is a schematic representation, in top view, of the light-emitting module according to the fifth embodiment of the invention, while applying to each of the different embodiments of the invention.

It can be seen that the first screen 412 has a width, in a direction perpendicular to the optical axis 408, which is limited and determined by the light beam formed by the rays 414 which are emitted forward directly by the light source 404 and likely to meet the lens 410. It can also be seen that the second screen 422 has a width, in the direction perpendicular to the optical axis 408, which is greater than that of the first screen 412 and determined by the light beam formed by the rays 416 which are reflected by the reflective surface 406.2 of the collector 406 and likely to meet the lens 410. For this purpose, the second screen 422 can have a curved profile in the plane of the view in FIG. 11. In this case, the rear face 422.1 of the second screen has a concave curved profile.

Figure 12:
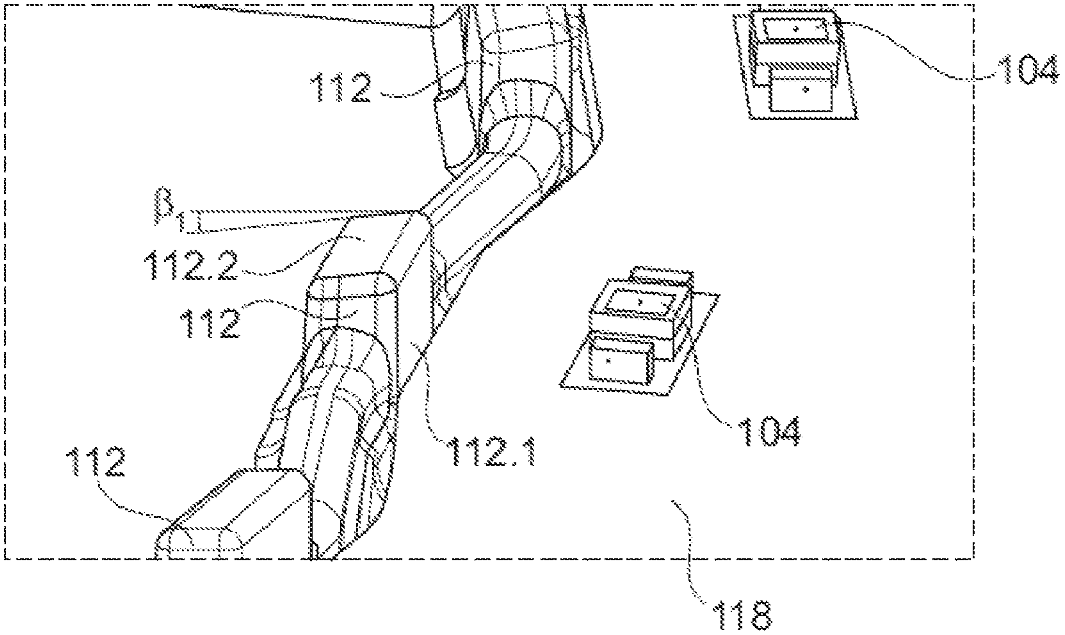
FIG. 12 is a perspective representation of an embodiment of a screen which has an inclined end face and is integrally formed with a cooling radiator.

FIG. 12 is a perspective representation of an embodiment of a screen which has an inclined end face and is integrally formed with a cooling radiator, as in the second embodiment in FIGS. 5 and 6.

FIG. 12 reveals a plate 118 supporting a plurality of light sources 104 and a screen 112 disposed in front of each of the light sources 104. In this case, the screens 112 are integrally formed with a heat sink made of heat-conducting material such as aluminum or a specific plastic material. The geometry of the screen 112 located in the center of the FIG. is schematized by an envelope in the shape of an inverted U. The inclination at an angle β1 can be seen.

Figure 13:
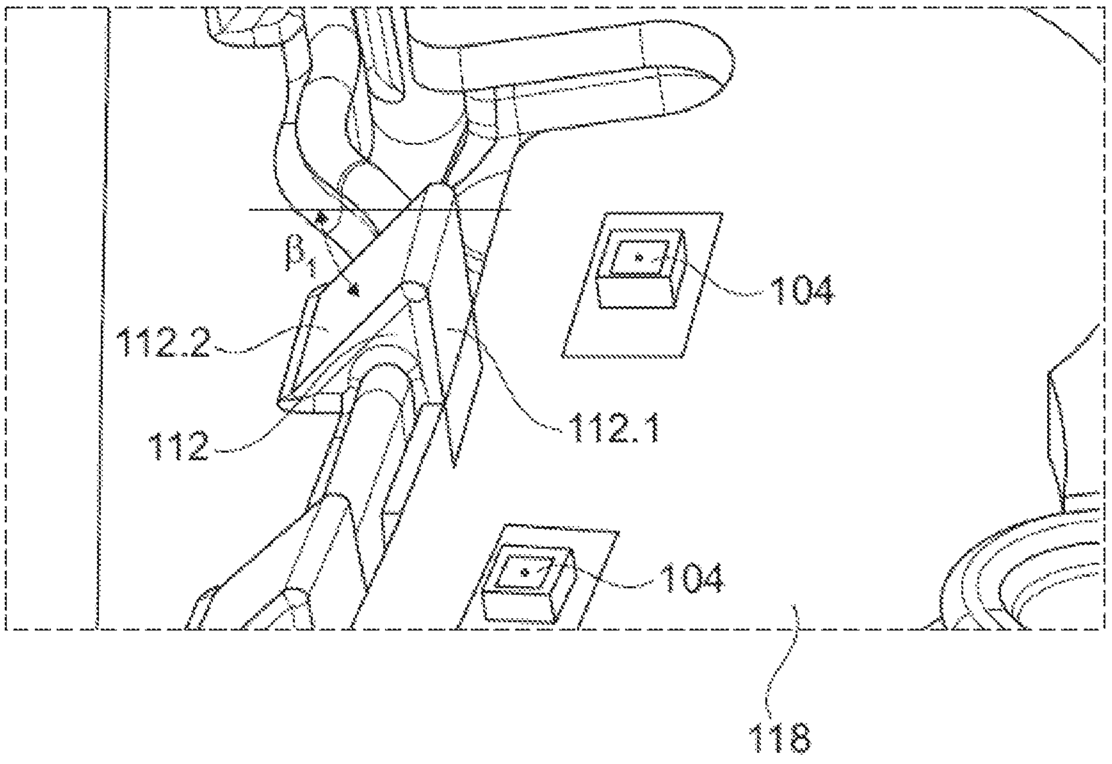
FIG. 13 is a perspective representation of an embodiment of a screen which has a more inclined end face and is integrally formed with a cooling radiator.

FIG. 13 is a perspective representation of an embodiment of a screen which has an inclined end face and is integrally formed with a cooling radiator, as in the second embodiment in FIGS. 5 and 6, as an alternative to FIG. 12.

It can be seen that the end face 112.2 has an inclination at a larger angle β1 than in FIG. 13. Also, the end face 112.2 coincides with a front face of the screen, unlike in FIG. 13, where the screen has a separate front face.

In general, the various light-emitting modules described above can be integrated into a lighting device in combination with other light-emitting modules. Also, for reasons of clarity of presentation, the light source and the collector are each shown as being single. It is understood, however, that certain light-emitting modules according to the invention may comprise a plurality of light sources and/or a plurality of collectors, in particular a plurality of collectors disposed side by side, each having a light source and an associated screen.

What is claimed is:

1. A light-emitting module comprising:

a light source capable of emitting light rays;

a collector with a reflective surface configured to collect and reflect a portion of the light rays, referred to as reflected light rays, in a reflected light beam along an optical axis of the light-emitting module, with the reflected light beam including the reflected light rays at a beam angle from the optical axis;

an optical system configured to project at least the majority of the reflected light beam in a projected light beam by imaging a portion of the reflective surface located, in a general direction of propagation of the reflected light beam along the optical axis, behind the light source; and a screen located in front of the light source, in the general direction of propagation of the light beam along the optical axis, with a rear face parallel to a side of the light source and arranged so as to gather direct light rays which are emitted forward by the light source and are not reflected by the reflective surface, with the screen including an end face, at a free end of the screen and facing the reflected light rays, which is arranged so as to be sloping away from the rear face at a slope angle greater than the beam angle.

2. The light-emitting module as claimed in claim 1, wherein the end face of the screen has a length, in the general direction of propagation of the light beam along the optical axis, of less than or equal to 1 mm, making it possible to avoid the reflected light rays.

3. The light-emitting module as claimed in claim 1, wherein the reflected rays have an inclination with respect to the optical axis, and wherein the end face of the screen has an inclination, with respect to the optical axis, which is greater than the inclination of the reflected rays adjacent to the end face, so as to be away from the reflected light rays.

4. The light-emitting module as claimed in claim 1, wherein the optical system has a focal region located on the reflective surface of the collector, behind the light source.

5. The light-emitting module as claimed in claim 1, wherein the end face of the screen has a reflectance in the visible light spectrum of less than 0.3.

6. The light-emitting module as claimed in claim 1, wherein the screen faces the reflective surface.

7. The light-emitting module as claimed in claim 1, wherein the screen extends transversely to the optical axis from a plate supporting the light source.

8. The light-emitting module as claimed in claim 7, wherein the screen is an outgrowth of a radiator for cooling the light source, the radiator being located on a face of the plate that is opposite the light source.

9. A light-emitting module comprising:

a light source capable of emitting light rays;

a collector with a reflective surface configured to collect and reflect a portion of the light rays, referred to as reflected light rays, in a reflected light beam along an optical axis of the light-emitting module;

an optical system configured to project at least the majority of the reflected light beam in a projected light beam by imaging a portion of the reflective surface located, in a general direction of propagation of the reflected light beam along the optical axis, behind the light source; and a screen located in front of the light source, in the general direction of propagation of the light beam along the optical axis, with a rear face arranged so as to gather direct light rays which are emitted forward by the light source and are not reflected by the reflective surface, with the screen including an end face, at a free end of the screen and facing the reflected light rays, which is arranged so as to be away from the reflected light rays and/or to absorb a portion of the reflected light rays, wherein the screen is a first screen located on the same side of the optical axis as the light source, the light-emitting module further comprising a second screen located on the opposite side of the optical axis and in front of the reflective surface, and including a rear face configured to gather direct light rays which are emitted forward by the light source, are not reflected by the reflective surface and pass beside the end face of the first screen and between this rear face and the reflective surface.

10. The light-emitting module as claimed in claim 9, wherein the second screen includes an end face at a free end of the second screen and facing the reflected light rays, which is arranged so as to be away from the reflected light rays, and to absorb and/or reflect the reflected light rays toward a lower half of the reflected light beam.

11. The light-emitting module as claimed in claim 10, wherein the reflected rays have an inclination with respect to the optical axis, and wherein the end face of the second screen has an inclination, with respect to the optical axis, which is greater than the inclination of the reflected rays adjacent to the end face, so as to be away from the reflected light rays.

12. The light-emitting module as claimed in claim 10, wherein the end face of the second screen has a reflectance in the visible light spectrum of less than 0.3.

13. The light-emitting module as claimed in claim 10, wherein the end face of the second screen has a convex curvature capable of reflecting the reflected light rays toward the lower half of the light beam.

14. The light-emitting module as claimed in claim 9, wherein the second screen is located in front of the reflective surface of the collector.

15. The light-emitting module as claimed in claim 9, wherein the second screen is supported by the collector.

16. A vehicle headlamp comprising a light-emitting module with the light-emitting module including:

a light source capable of emitting light rays;

a collector with a reflective surface configured to collect and reflect a portion of the light rays, referred to as reflected light rays, in a reflected light beam along an optical axis of the light-emitting module, with the reflected light beam including the reflected light rays at a beam angle from the optical axis;

an optical system configured to project at least the majority of the reflected light beam in a projected light beam by imaging a portion of the reflective surface located, in a general direction of propagation of the reflected light beam along the optical axis, behind the light source; and a screen located in front of the light source, in the general direction of propagation of the light beam along the optical axis, with a rear face parallel to a side of the light source and arranged so as to gather direct light rays which are emitted forward by the light source and are not reflected by the reflective surface, with the screen including an end face, at a free end of the screen and facing the reflected light rays, which is arranged so as to be sloping away from the rear face at a slope angle greater than the beam angle.

* * * * *